(No Model.)
2 Sheets—Sheet 1.
J. F. WOOD.
COFFEE POT.
No. 363,931.
Patented May 31, 1887.
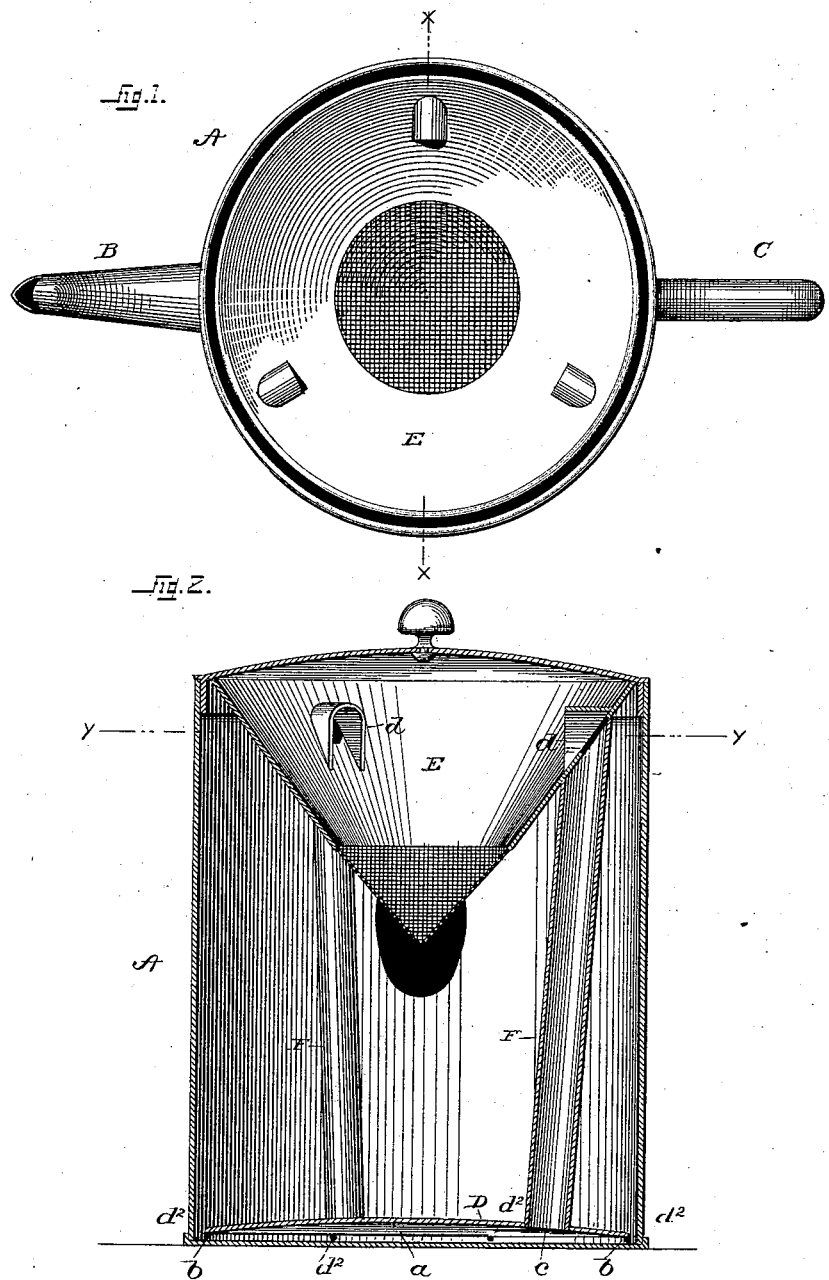
WITNESSES
James F. Wood,
INVENTOR
by
his Attorney (No Model.) 2 Sheets—Sheet 2.

J. F. WOOD.
COFFEE POT.

No. 363,931. Patented May 31, 1887.

WITNESSES

James F. Wood,
INVENTOR
by
J. R. Littell,
his Attorney.

UNITED STATES PATENT OFFICE.

JAMES F. WOOD, OF WOODYARD, OHIO.

COFFEE-POT.

SPECIFICATION forming part of Letters Patent No. 363,931, dated May 31, 1887.

Application filed November 15, 1886. Serial No. 218,925. (No model.)

*To all whom it may concern:*

Be it known that I, JAMES F. WOOD, a citizen of the United States, residing at Woodyard, in the county of Athens and State of Ohio, have invented certain new and useful Improvements in Coffee-Pots; and I do hereby declare that the following is a full, clear, and exact description of the invention, which will enable others skilled in the art to which it appertains to make and use the same.

My invention relates to coffee and tea pots, the object of the invention being to provide the same with a strainer of improved construction adapted to hold the tea or coffee, and pipes connecting the strainer with a plate or diaphragm adapted to rest on the bottom of the pot, whereby the steam generated by the boiling water will cause a portion of the water to be elevated through the pipes into the strainer, through the coffee or tea, and back into the pot proper.

Figure 3:
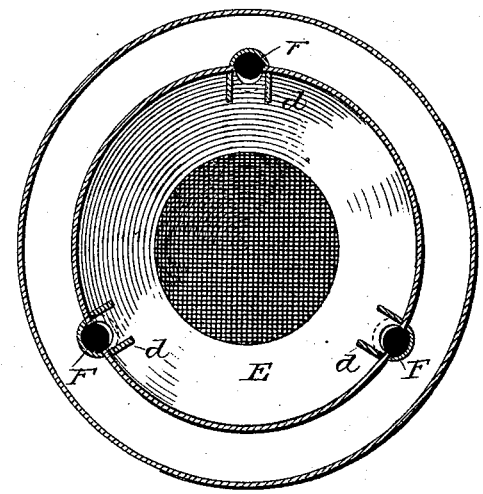
Figure 4:
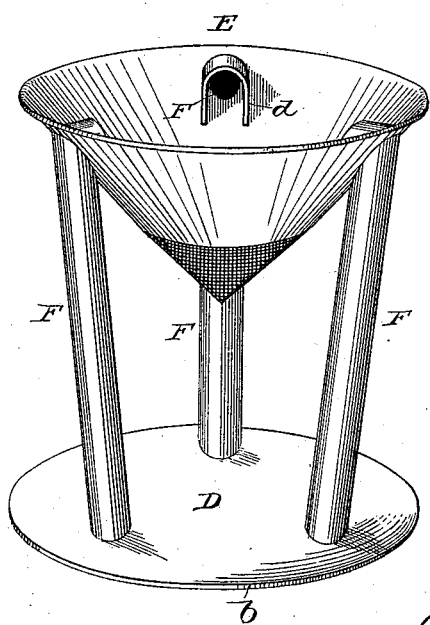

In the drawings, Figure 1 is a plan view of a coffee-pot embodying my invention, with the cover removed. Fig. 2 is a vertical section on the line $x\ x$ of Fig. 1. Fig. 3 is a horizontal section on the line $y\ y$ of Fig. 2; and Fig. 4 is a detail view of the strainer, diaphragm, and pipes removed from the pot.

Corresponding parts in the several figures are denoted by the same letters of reference.

Referring to the drawings, A represents the pot, which is of ordinary construction, and is provided with a spout, B, and cover C, also of ordinary construction. Within the pot A is located a diaphragm, D, which rests on the bottom of said pot. This diaphragm is preferably of a single sheet of metal, and is convex, as shown, so that a space, $a$, is formed between it and the bottom of the pot. The said diaphragm is provided with a downwardly-extending circumferential flange, $b$, which rests on the bottom of the pot and supports the diaphragm.

E represents the strainer, which is of the form of an inverted cone. The upper portion of this strainer is imperforate, while the lower section is foraminous, as shown. By this arrangement the water entering the strainer passes through all of the contents of the strainer.

F represents a series of pipes or tubes—in the present instance three. These pipes or tubes are fitted at their lower ends in holes or openings $c$ in the diaphragm, while their upper ends communicate with openings in the imperforate portion of the strainer. It will thus be seen that the strainer is firmly and securely supported.

Fitted over the upper portion and sides of the openings in the strainer are hoods $d$, which cause the water raised through the tubes F to fall directly into the strainer and pass through the contents thereof.

The operation is as follows: The desired quantity of water is placed in the pot and the tea or coffee in the strainer. When the water boils, there will be a sufficient quantity of steam collected under the diaphragm to cause water to be elevated through the pipes into the strainer, and through the same back into the pot, thereby maintaining a constant ciculation of water through the pipes or tubes and strainer.

It will be observed that the diaphragm covers the greater heating surface of the bottom of the pot, and that the temperature of the water which enters under the diaphragm is therefore almost instantly raised. The specific gravity of this hot water directly under the diaphragm, being lighter than that of the cooler water in the body of the pot, will cause the hot water and steam to boil up through the tubes and into the strainer as the cooler water from the outside passes in under the diaphragm to fill the vacuum thus created. By action of the boiling water and pressure of the steam under the diaphragm the edge of the latter is raised from the bottom of the pot, and alternately at one side and the other, thus facilitating the entrance of the cooler water under the diaphragm. To further facilitate the entrance of the water under the diaphragm, the latter may be provided with small openings, as shown at $d^2$. Fig. 2.

It will be obvious that my improvement forms in itself an article of manufacture adapted to be manufactured and sold separate from the pot, and to be applied to pots in ordinary use.

I am aware that coffee and tea pots have heretofore embodied in their construction convexed diaphragms at the bottom and straining-cups at the top, various forms of tubes and connections being provided for connecting the diaphragm and strainer. I therefore do not broadly claim such construction, my invention being designed to overcome the numerous objections found in the more complicated prior constructions and to provide a simple and efficient straining attachment adapted for use in coffee-pots now ordinarily in use.

To this end my invention consists in the improved construction and arrangement of parts, as specifically set forth in the following claim:

Having thus described my invention, what I claim as new, and desire to secure by Letters Patent, is—

As an improved article of manufacture, the herein-described separable strainer attachment for coffee-pots, consisting of a convex diaphragm provided with a downwardly-extending circumferential flange adapted to rest upon the bottom of the pot, an inverted cone-shaped strainer consisting of an imperforate upper portion and a foraminous lower section, a series of pipes or tubes supporting the strainer and extending from the diaphragm to the under side of the imperforate upper portion of the strainer, and the hoods $d$, provided upon the inner face of the imperforate portion of the strainer, and surrounding the opening forming the top mouth at each tube, substantially as and for the purpose set forth.

In testimony whereof I affix my signature in presence of two witnesses.

JAMES F. WOOD.

Witnesses:
  CHAS. REDMAN,
  A. A. POWER.